Patented Apr. 9, 1929.

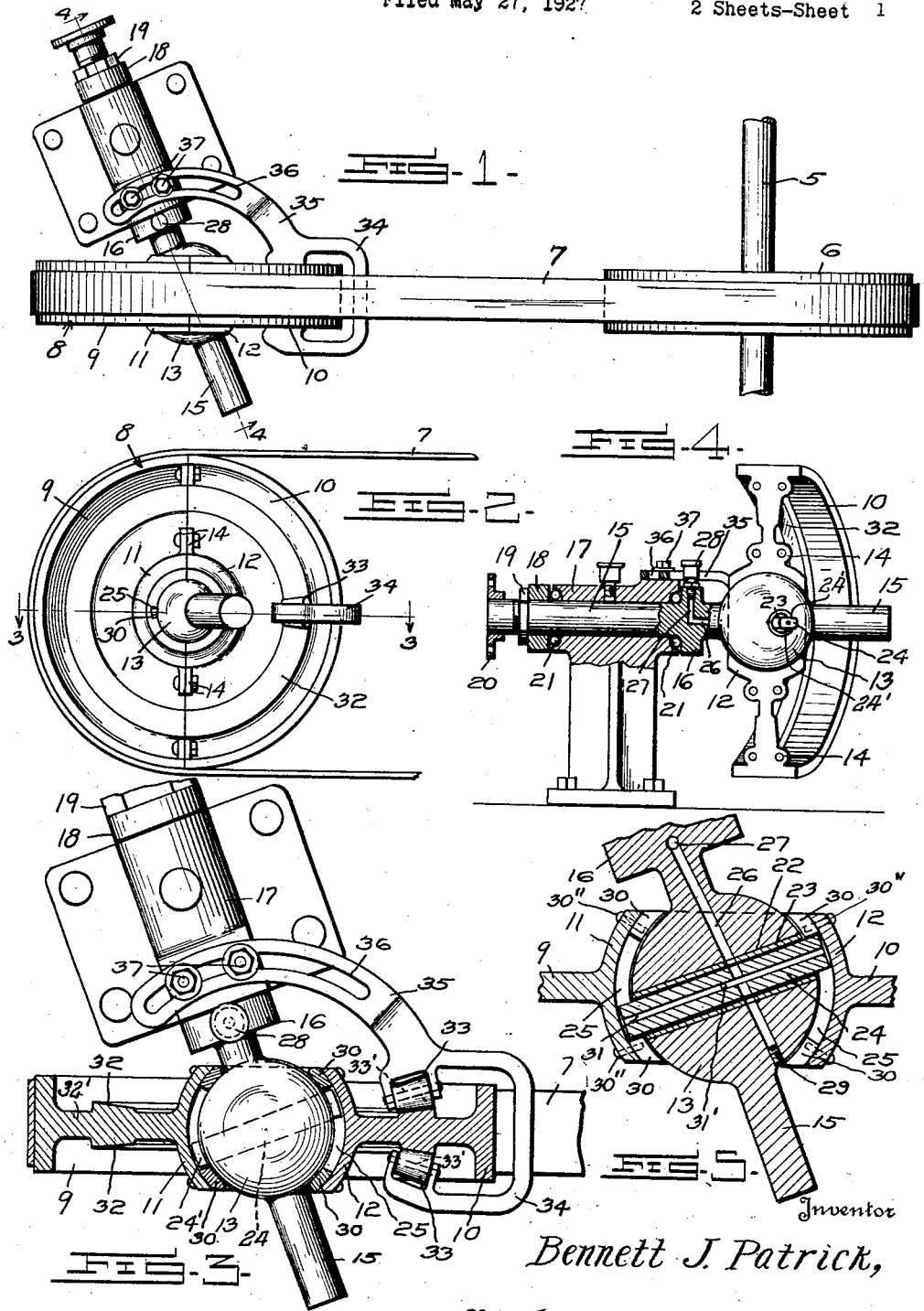

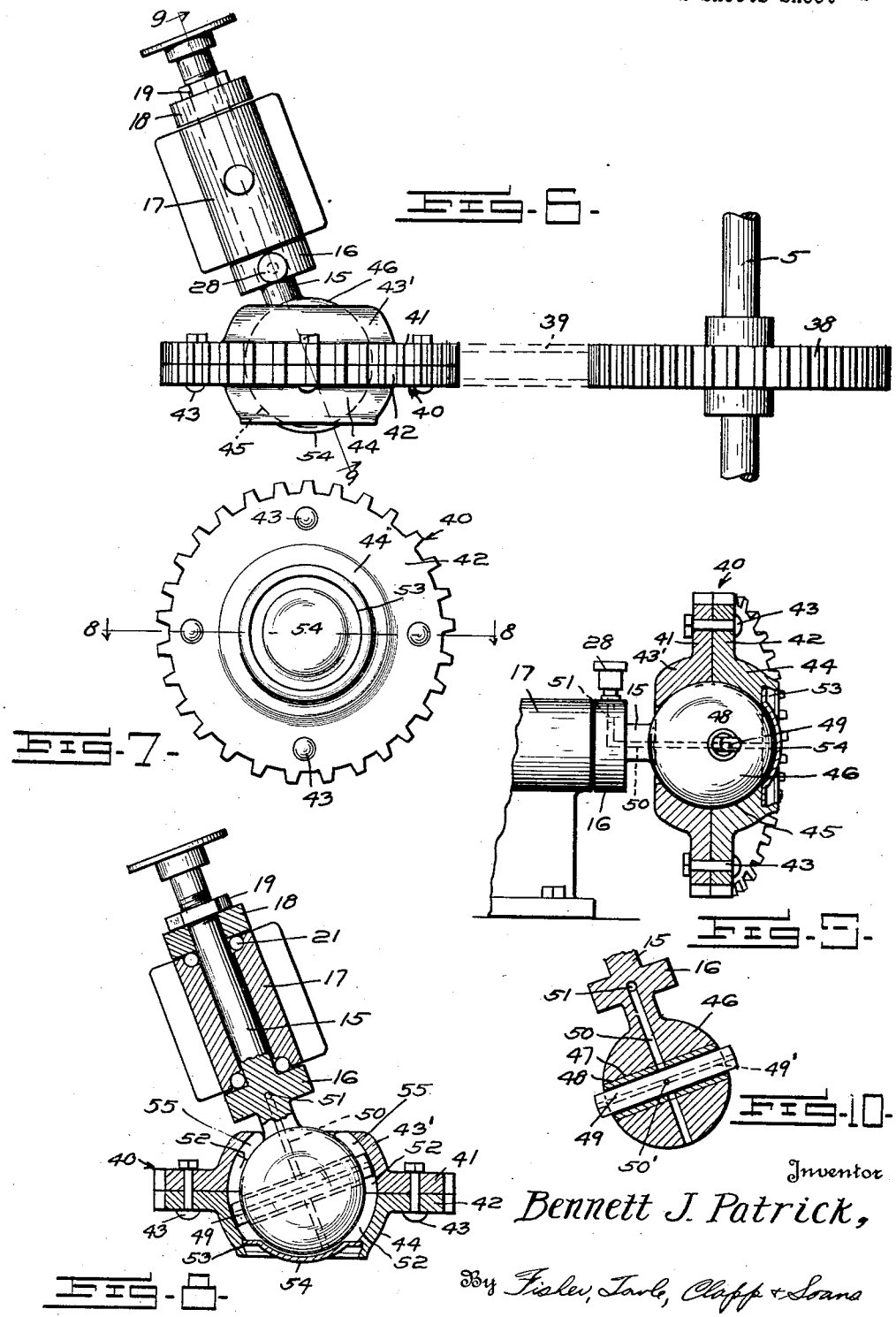

1,708,680

UNITED STATES PATENT OFFICE.

BENNETT J. PATRICK, OF CHICAGO, ILLINOIS, ASSIGNOR TO BULL DOG MOTORS CORPORATION, OF DOVER, DELAWARE, A CORPORATION OF DELAWARE.

MULTIANGULAR POWER TRANSMISSION.

Application filed May 27, 1927. Serial No. 194,552.

This invention relates to multi-angular power transmission mechanisms and more specifically to means for transmitting rotation from a driven shaft to another shaft which is disposed laterally from the driven shaft and at an angle thereto.

The principal object of the invention is to provide means whereby power can be transmitted from one revolving shaft to another shaft which is disposed at an angle to the driven shaft. Other objects of the invention are; to provide an arrangement for maintaining certain cooperating parts in operative alignment; to provide means for preventing axial movement of the angularly extending shaft; to provide means for effectively lubricating the mechanism; to provide practical and substantial means for maintaining operative relation between the various parts constituting the mechanism, and in general, to provide an improved structure of the class described.

Other objects and advantages of the invention will be understood by reference to the following specification and accompanying drawings wherein I have illustrated a selected embodiment of the invention and a modification thereof, both of the forms illustrated being shown as used for driving a shaft which is spaced from and disposed at an angle to a drive shaft.

In the drawings:

Fig. 1 is a plan view.

Fig. 2 is a side elevation of a portion of Fig. 1.

Fig. 3 is a section on the line 3—3 of Fig. 2.

Fig. 4 is a section on the line 4—4 of Fig. 1.

Fig. 5 is a section of a detail of construction illustrating the method of lubricating the mechanism.

Fig. 6 is a plan view illustrating a modified form of the invention.

Fig. 7 is a side elevation of a portion of Fig. 6.

Fig. 8 is a section on the line 8—8 of Fig. 7.

Fig. 9 is a section on the line 9—9 of Fig. 6, and

Fig. 10 is a section of a detail of construction illustrating the means for lubricating the modified form of structure.

Referring now more particularly to Figs. 1 to 5 inclusive, I have indicated a drive shaft 5 having affixed thereto a pulley 6, which shaft and pulley may be driven by any suitable source of power. A second shaft is indicated at 15 spaced laterally from the shaft 5 and extending at an angle thereto, and provided with mechanism mounted thereon whereby it may be driven by means of a flat belt indicated at 7 from the drive shaft and pulley 5 and 6.

The shaft 15 is rotatably mounted in a bearing 17 and means are provided for preventing axial movement of the shaft through the bearing. Such means comprises a collar 16 on the shaft 15, preferably made integral therewith and a collar 18 slidable on the shaft and adapted to be adjusted along the shaft by means of a nut 19 threadedly engaging suitable screw threading provided on a portion of the shaft 15. The collars 16 and 18 on the shaft are adapted to be disposed at opposite ends of the bearing member 17 and ball bearings 21 are interposed between the end of the bearing member and adjacent face of the adjacent collar. I prefer to provide ball races, as indicated in Fig. 4, for housing the ball bearings 21 whereby the same are retained in operative position between the respective ends of the bearing and adjacent collar. Suitable means such as an oil cup, as best shown in Fig. 4, may be provided for supplying a lubricating medium to the shaft 15 in the bearing 17, as well as to the ball bearings 21.

A pulley 8 is mounted on the shaft 15 by means which will cause the pulley and shaft to rotate together when driven by means of the belt 7 from the driven pulley 6, but which means will permit rotation of the shaft 15 and driving member or pulley 8 about diverging axes by permitting relative pivotal or swivelling movement of the pulley in a lateral direction relative to the plane of rotation of the pulley. According to the present invention, such means comprises a ball member 13 on the shaft 15, preferably made integral therewith and a socket portion provided in the pulley 8 to fit the ball member 13.

The pulley 8 is preferably made up in two sections 9 and 10, which sections are provided with socket portions 11 and 12 respectively, which socket portions are adapted to form a socket adapted to receive and retain the ball portion 13 of the shaft when the two pulley sections are assembled and secured together. Each of the pulley sections may be provided with suitable means such as indicated at 14, in Figs. 8 and 9 for receiving bolts or the like for securing the sections together. The socket portions 11 and 12 in each of the sections 9 and 10 of the pulley are each provided with a transversely extending groove 25 which is adapted to receive the adjacent end of a pin 24 which extends through the ball member 13. The pin 24 is rotatably mounted in an aperture 22 extending through the ball member 13, at substantially right angles to the axis of the shaft 15, a suitable bushing 23 being preferably provided in which the pin rotates a limited amount during operation of the mechanism, as will be hereinafter explained.

For the purpose of lubricating the ball and socket mechanism above described, I provide an oil canal 26 drilled through the ball member 13 as best shown in Fig. 5, the canal 26 being positioned so as to communicate with a substantially radially extending oil canal 27 in the collar 16 which in turn, communicates with a suitable oil cup 28 which is mounted on the said collar 16. The outer end of the oil canal 26 may conveniently be closed by means of a screw plug 29. The oil canal 26 extends crosswise through the pin 24 and bushing 23 and the pin is provided with a longitudinally extending oil canal 31 which communicates with the main or feed canal 26. It will be apparent that oil or other suitable lubricant which is fed into the canal 26 will flow through the canal 31 in the pin and exude therefrom at its opposite ends to lubricate the mechanism in the grooves 25 wherein the ends of the pin 24 move. I also prefer to provide an oil channel 31' extending crosswise of the pin 24 and communicating with the channel 31 therein for supplying lubricant to the bushing 23 and pin 24. In order to prevent the escape of the lubricating medium through the grooves 25, I prefer to provide plug members 30 in the opposite ends thereof secured therein by suitable means, such as screw members 30''.

The operation of the above described mechanism is substantially as follows: The belt 7 which extends around the drive pulley 6 is effective to rotate the pulley 8, and the pulley 8 is effective to rotate the shaft 15 through its pin and grooved connection 24 and 25 with the ball member 13 on the shaft 15. It will be understood that as the shaft 15 rotates, there will be a reciprocating movement of the ends of the pins 24 in the grooves 25, the pulley being necessarily retained in substantial alignment with the drive pulley 6 so as to maintain the belt 7 in operative engagement with both of the pulleys. I prefer to flatten the end portions of the pin 24 as shown at 24', and it will be understood that there will be a limited amount of rotation of the pin 24 in the bushing 23, for which reason I prefer to make the above described provision for lubricating the bearing surface between the pin and bushing 23.

One or more means for maintaining the pulley 8 in alignment with the drive pulley 6 may be provided, and such means may be of any convenient form. In the present embodiment, I prefer to provide adjustable mechanism such as best shown in Figs. 1 and 3. The mechanism herein shown comprises a bracket member 35 having a forked end 34 provided with a pair of roller members 33 mounted on the ends of its forked portion and adapted to engage suitable track or guide rings 32 provided on the opposite faces of the web portion 32' of the pulley. The bracket member 35 is provided with an arcuate portion having an arcuate slot 36 therein, which is adapted to receive a pair of clamping members 37 for clamping the arcuate portion of the bracket against a portion of the bearing member 17. It will be apparent that by releasing the clamping members 37, the bracket member 35 may be adjusted to thereby move the pulley member 8 to the desired position in which it may be retained by again clamping the bracket member in fixed position.

In Figs. 6 to 10 inclusive, I have illustrated a modified form of my invention wherein I substitute sprocket gear and chain driving means for the pulley and belt means above described, and wherein the ball and socket arrangement is provided on one end of a shaft instead of intermediate the ends of the shaft as in the above described form. In the modified form shown in Figs. 6 to 10 inclusive, a drive shaft 5 is shown and may be considered to be a shaft driven by any suitable source of power as in the previously described embodiment. A sprocket gear 38 is fixedly mounted on the drive shaft 5 and is adapted to receive a suitable chain indicated by broken lines 39 for driving a second sprocket gear member 40.

The sprocket gear member 40 is preferably made up of two sections 41 and 42 which, when placed together face to face, and so secured by suitable means such as bolt members 43, constitute a unitary sprocket gear member. Each of the gear sections 41 and 42 are provided with socket portions 43' and 44 respectively, and these socket portions, when the gear sections are secured together, form a single socket member 45 as will be readily understood from an inspection of Figs. 8 and 9. Diametrically opposite grooves 52 are provided in the socket 45 for receiving the ends of a pin 49 which extends through an aperture 47 in the ball member 46 which is preferably provided as an integral part on the end of the shaft 15.

I prefer to provide a suitable bushing 48 in the aperture 47 in which the pin 49 may rotate a limited amount as above explained in connection with Figs. 1 to 5 inclusive. In the present embodiment of the invention I provide similar lubricating means which comprises an oil cup 28 secured to the collar 16 and communicating by means of apertures 50 and 51 with the pin 49 and outer surface of the ball member 46. Suitable apertures 49' and 50' are provided in the pin 49 for conveying lubricant supplied through the aperture 50, to the opposite ends of the pin and adjacent working surface in the socket 45 and grooves 52. In order to prevent leakage of the lubricant from the outer ends of the grooves 52, and also to retain the lubricant fed through the outer end of the aperture 50 to the surface of the ball member 46, I provide a cap 54 which is pressed into a suitable recess 53 provided in the socket portion 44 of the sprocket gear section 42. The cap 54 may be maintained in position in any suitable manner, preferably by forcing a portion of the metal of the socket member 44 over the adjacent edge of the cap member.

Suitable plugs 55 may be provided in the inner end of the grooves 52 for preventing escape of the lubricating medium therethrough and these plugs may be secured in place in any desirable way. The shaft 15 is preferably mounted in a bearing 17 as described in connection with Figs. 1 to 5 inclusive, means being provided to prevent axial movement of the shaft therethrough.

When sprocket gears and a chain are used as in the last described embodiment, I find it unnecessary to provide additional means for maintaining the gear member 40 in alignment with the gear 38, since the chain member will be effective to prevent pivotal movement of the gear member 40 on the ball 46, and in this respect, this latter embodiment is advantageous over the previously described embodiment. It will be observed that in both of the described forms of invention, I provide a socket construction wherein the socket is formed of two sections; in the first instance, the driving member or pulley which includes the socket being divided diametrically into two halves, and in the second instance, the driving or sprocket gear member 40 being divided transversely to the axis of the member into two sections. This arrangement facilities machining of the socket members and also of the portions of the grooves provided therein. It will further be apparent that my invention may be applied to a wide range of angularly extending shafts, and it will, of course, be understood that while I have shown only one shaft as being provided with a ball and socket arrangement, both shafts may be so provided in a case where it would be impractical to fixedly mount a pulley or driving member on one shaft as herein described, and it will, of course, be obvious that the driving power may be transferred through the ball and socket arrangement to another shaft as well as from another shaft to the shaft provided with this mechanism.

I am aware that changes may be made in the form and construction of the above described multi-angular power transmission mechanism without departing from the spirit of the invention, and since the described details are merely illustrative of a single phase of the invention, it will be understood that the scope of the same should be determined by reference to the following claims which should be construed as broadly as possible consistent with the state of the art.

I claim as my invention:

1. In a power transmission mechanism of the class described, the combination of a shaft, means for rotatably mounting said shaft, a driving member mounted on said shaft obliquely thereof, means for connecting said shaft and driving member so as to cause the same to rotate together but permitting rotation thereof on diverging axes, said means comprising a ball member secured to the said shaft, means on said driving member forming a socket for receiving said ball member, said socket being provided with a pair of diametrically oppositely disposed grooves, a pin extending substantially diametrically through said ball member, rotatably mounted therein, and provided with flattened end portions projecting from said ball member and engaging said grooves, said flattened end portions being effective to cause the pin to oscillate within the ball member.

2. In a power transmission of the class described, the combination of a shaft, means for rotatably mounting said shaft, a driving member mounted on said shaft obliquely thereof, means for connecting said shaft and driving member so as to cause the same to rotate together but permitting rotation thereof on diverging axes, said means comprising a ball member secured to the said shaft, means on said driving member forming a socket for receiving said ball member, said socket being provided with a pair of diametrically oppositely disposed grooves, a pin extending substantially diametrically through said ball member, rotatably mounted therein, and provided with flattened end portions projecting from said ball member and slidably engaging said grooves, said ball being provided with an aperture for permitting lubrication of the bearing surface of said pin in the ball.

3. In a power transmission mechanism of the class described, the combination of a shaft, means for rotatably mounting said shaft, a driving member mounted on said shaft obliquely thereof, means for connecting said shaft and driving member so as to cause the same to rotate together but permitting rotation thereof on diverging axes, said means comprising a ball member secured to said shaft, means on said driving member forming a socket for receiving said ball member, said socket being provided with a pair of diametrically oppositely disposed grooves, a pin extending substantially diametrically through said ball member, rotatably mounted therein, and provided with flattened end portions projecting from said ball member and engaging said grooves, said ball and pin being provided with apertures for permitting lubrication of the bearing surface of said pin in the ball and of the ends of the pin in said grooves.

4. In a power transmission mechanism of the class described, the combination of a shaft, means for rotatably mounting said shaft, a driving member mounted on said shaft obliquely thereof, means for connecting said shaft and driving member so as to cause the same to rotate together but permitting rotation thereof on diverging axes, said means comprising a ball member secured to said shaft, means on said driving member forming a socket for receiving said ball member, said socket being provided with a pair of diametrically oppositely disposed grooves, a pin extending longitudinally diametrically through said ball member, rotatably mounted therein, and provided with flattened end portions projecting from said ball member and engaging said grooves, said ball and pin being provided with apertures for permitting lubrication of the bearing surface of said pin in the ball and of the ends of the pin in said grooves, and closure means in the ends of said grooves for retaining lubricant therein.

5. In a power transmission mechanism of the class described, the combination of a shaft, means for rotatably mounting said shaft, a driving member mounted on said shaft obliquely thereof, means for connecting said shaft and driving member so as to cause the same to rotate together but permitting rotation thereof on diverging axes, said means comprising a ball member secured to said shaft, means on said driving member forming a socket for receiving said ball member, said socket being provided with a pair of diametrically oppositely disposed grooves, a pin extending substantially diametrically through said ball member and rotatably mounted therein, and provided with flattened end portions projecting from said ball member and engaging said grooves, said ball member being provided with an aperture extending in the direction of the axis of said shaft and extending transversely through said pin member, and said pin member being provided with an aperture extending lengthwise therethrough and communicating with said transversely extending aperture, means communicating with said first mentioned aperture for supplying lubricant thereto, thereby to facilitate lubrication of the bearing surfaces between the ends of said pin and the walls of said grooves in said socket member.

6. In a power transmission mechanism of the class described, the combination of a shaft, means for rotatably mounting said shaft, a driving member mounted on said shaft obliquely thereof, means for connecting said shaft and driving member so as to cause the same to rotate together but permitting rotation thereof on diverging axes, said means comprising a ball member secured to said shaft, means on said driving member forming a socket for receiving said ball member, said socket being provided with a pair of diametrically oppositely disposed grooves, a pin extending substantially diametrically through said ball member and rotatably mounted therein, and provided with flattened end portions projecting from said ball member and engaging said grooves, said ball member being provided with an aperture extending in the direction of the axis of said shaft and extending transversely through said pin member, and said pin member being provided with an aperture extending lengthwise therethrough and communicating with said transversely extending aperture, said pin being also provided with another aperture extending transversely of the pin, from said lengthwise extending aperture to the outside of the pin, means communicating with said first mentioned aperture for supplying lubricant thereto, thereby to facilitate lubrication of the bearing surfaces between said pin and ball member, and between the ends of said pin and the walls of said grooves in said socket member.

7. In a power transmission of the class described, the combination of a rotatably mounted shaft, a driving pulley mounted on said shaft and including a web portion provided with an outwardly facing annular track on each of its faces, means for locking said pulley and shaft together so as to cause the same to rotate together, but permitting rotation thereof on diverging axes, and means for maintaining said driving member in pre-determined position relative to the axis of said shaft, said means comprising a bracket member having a forked end straddling a portion of said pulley, a pair of rollers rotatably mounted on said forked end and respectively engaging the tracks on opposite sides of the web of said pulley, and means for fixedly mounting said bracket member.

8. In a power mechanism of the class described, the combination of a bearing member, a shaft rotatably mounted in said bearing member, a driving pulley mounted on said shaft adjacent said bearing member and including a web portion provided with an outwardly facing annular track on each of its faces, means for locking said pulley and shaft together so as to cause the same to rotate together but permitting rotation thereof on diverging axes, and means for maintaining said driving member in predetermined angular position relative to the axis of said shaft, said means comprising a bracket member having a forked end straddling a portion of said pulley, a pair of rollers rotatably mounted on said forked end and respectively engaging the tracks on opposite sides of the web of said pulley, and means for adjustably mounting said bracket on said bearing member, thereby to permit adjustment of the angular position of said pulley relative to the axis of the shaft.

BENNETT J. PATRICK.